Oct. 18, 1960     L. BUSTIN     2,956,638
RETRACTABLE STAIRCASE
Filed June 11, 1956     2 Sheets-Sheet 1
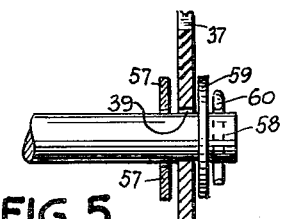
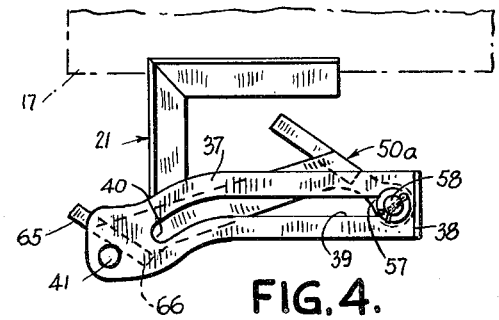
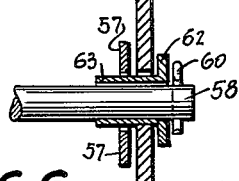
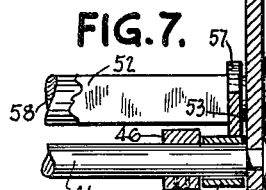
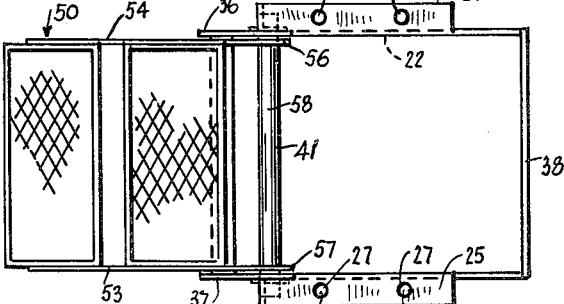
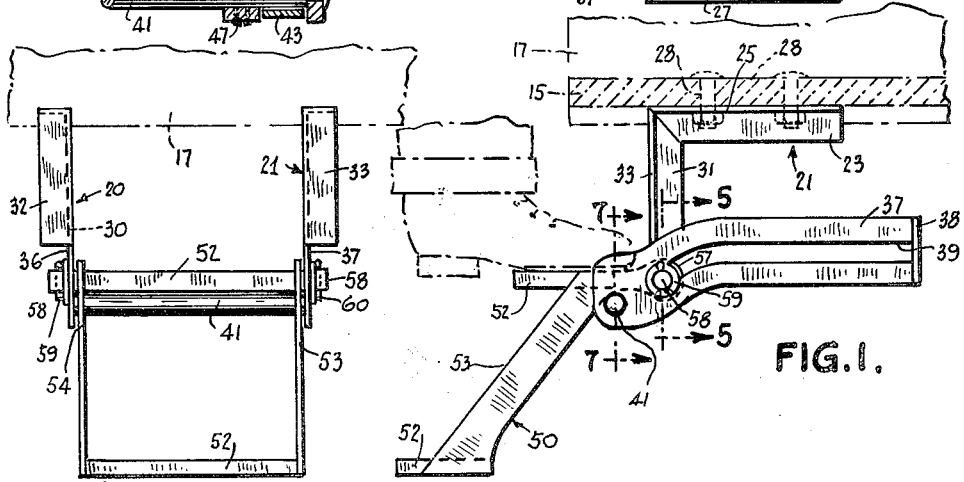
INVENTOR.
LEOPOLD BUSTIN.
BY *Percy Freeman*
ATTORNEY.

Oct. 18, 1960 L. BUSTIN 2,956,638
RETRACTABLE STAIRCASE
Filed June 11, 1956 2 Sheets-Sheet 2
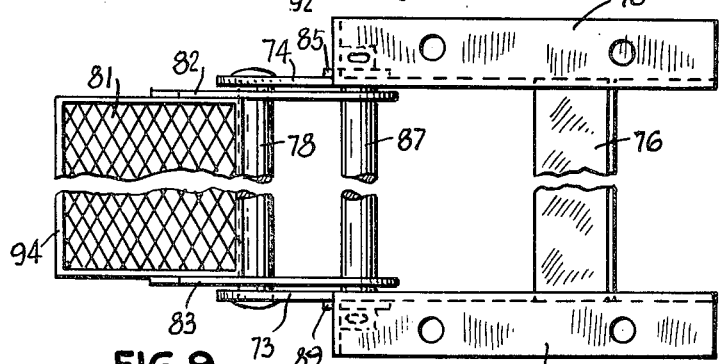
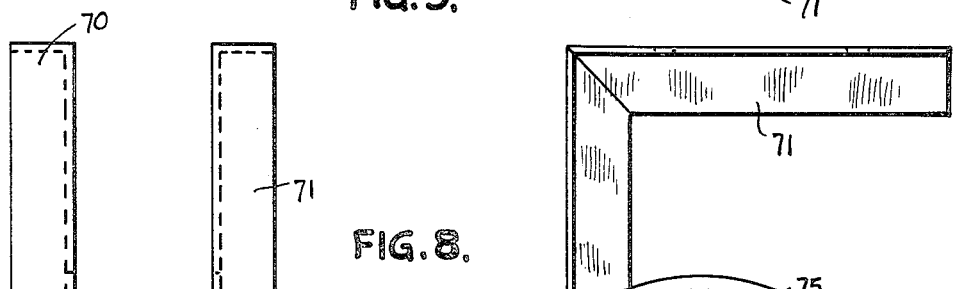
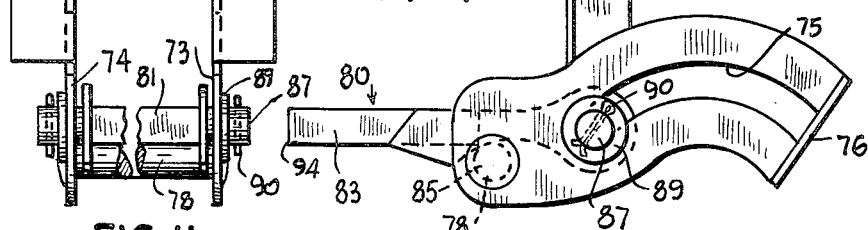
INVENTOR.
LEOPOLD BUSTIN.
BY Percy Freeman
ATTORNEY.

United States Patent Office 2,956,638
Patented Oct. 18, 1960

2,956,638

RETRACTABLE STAIRCASE

Leopold Bustin, Emmons Road, Flanders, N.J.

Filed June 11, 1956, Ser. No. 590,576

1 Claim. (Cl. 182—88)

This invention relates to staircase construction and, more particularly, to retractable staircase construction for use on automotive vehicles such as trucks and the like.

While various types of steps and stairway devices have been used in connection with vehicles, they have often interfered with the loading and the unloading of the vehicle, protruded from the limits of the vehicle body, or have been difficult to move between an operative and inoperative position. While various types of stationary steps have been used, such must ordinarily be suspended beneath the vehicle body and inwardly from the end thereof so as not to be damaged when the vehicle is backed up to a loading platform and to, otherwise, meet the standards of various ordinances which require such steps to be kept within the outer limits of the vehicle body. This arrangement, of course, makes it difficult to ascend the steps since a worker must also hold on to a stationary member in order to maintain his balance.

It is, therefore, much more desirable to have the steps extending outwardly from the rear of the vehicle when they are required and which may be retracted to an unusable position while the vehicle is in motion. Heretofore, where such retractable steps were contemplated, the necessity of having to provide locking means and retaining means for holding the steps in such inoperative position made the use of these various retractable steps impractical and cumbersome. An object of this invention, therefore, is to provide a retractable stairway that is simple in construction, efficient in operation, and which will overcome the aforementioned difficulties.

Another object of this invention is to provide a retractable stairway that is easy to operate and which does not require the use of additional locking members or retaining means to maintain the stairway in a retracted or operative position.

A still further object of this invention is to provide a retractable stairway that may be selectively moved between an operative and an inoperative position in which the staircase is maintained in such selective position by gravity and which, when so disposed, is able to withstand vibrations and shocks without being moved therefrom.

All of the foregoing and still further objects and advantages of this invention will become apparent from a study of the following specification, taken in connection with the accompanying drawing, wherein:

Fig. 1 is a side elevational view of one form of retractable stairway made in accordance with this invention, shown in operative position and in association with a truck body indicated by broken lines.

Fig. 2 is a top elevational view of the device shown in Fig. 1.

Fig. 3 is an end view of the device shown in Fig. 1.

Fig. 4 is a view similar to Fig. 1, showing the staircase in a retracted, inoperative position.

Fig. 5 is a cross-sectional view taken along line 5—5 of Fig. 1, showing the bearing arrangement of associated elements.

Fig. 6 is a view similar to Fig. 5, showing a modified form of bearing arrangement.

Fig. 7 is a cross-sectoinal view taken along 7—7 of Fig. 1.

Fig. 8 is a view similar to Fig. 1 showing a modified form of staircase construction, in an extended, operative position.

Fig. 9 is a top elevational view of the device shown in Fig. 8.

Fig. 10 is a view similar to Fig. 8 showing the staircase in a retracted, inoperative position.

Fig. 11 is an end view of the staircase shown in Fig. 8.

Referring now to Figs. 1 to 7 of the drawing, one form of staircase construction made in accordance with this invention is shown in association with the center sills 15 of the rearward extremity of a truck body 17. The staircase is secured to the vehicle underframe by means of a pair of inverted L-shaped brackets 20, 21, each of which has a base portion having a longitudinally extending vertical web 22, 23, and a horizontal outwardly directed flange 24, 25. Each flange 24, 25, is provided with a series of holes 26, 27, respectively, that may accommodate fastening means, such as bolts 28, that may be used to secure the staircase to the vehicle underframe. The leg of each bracket 20, 21, has a vertically extending web 30, 31, that is provided with an outwardly directed flange 32, 33, respectively, to which is secured a longitudinally extending side frame 36, 37, that has a transverse connecting member 38 extending between adjacent ends thereof. Each side frame is provided with a substantially horizontal and rearwardly extending cam slot 39 that terminates at its extreme rearward portion in a downwardly and rearwardly extending portion 40. A bearing bar 41 extends between and connects the rearmost ends of the side frames 36, 37. A rotatable sleeve 43 is carried at each end of the bearing bar 41 and is maintained in operative position by means of an associated stop collar 46 fixed on the bearing bar 41 by means of a set screw 47.

The staircase assembly 50 comprises a number of steps 52 that are held in proper position by means of a pair of side pieces 53, 54, the upper ends 56, 57, of which are connected by means of a connecting shaft 58 extending transversely therebetween. The outer ends of the connecting shaft 58, in the manner of cam followers, extend through the slots 39 of the side frames and are held in position therein by means of washers 59 and removable cotter pins 60, as more clearly shown in Fig. 5. As an alternative, and to provide a removable bearing or follower element, a replaceable flanged bushing 62, having a cylindrical sleeve 63, may be substituted for the washers 59 as shown in Fig. 6. Referring to Fig. 4, it will be noted that the parts are so arranged that the distance between the axis of the connecting shaft 58 and the rearwardly directed edge 65 of the lower step is somewhat greater than the distance between the axis of the bearing bar 41 and the most distant portion of the slot 39 adjacent to the transverse connection member 38, whereas the distance between the axis of the connecting shaft 58 and the forwardly directed edge 66 of the lower step is less than the distance between the bearing bar 41 and the connecting member 38, all for definite purposes hereinafter described.

When placed in an operative position, as shown in Fig. 1, the staircase 50 is extended rearwardly of the truck body with the lower step 52 raised above the ground and constituting the first step in the staircase. In this position, the bearing portions of the connecting shaft 58 are carried by the lower portion 40 of each longitudinal slot 39 and the bearing bar 41 engages the uppermost ends of the undersurfaces of the side pieces 53, 54, thereby supporting the staircase 50 in the position shown.

All that is necessary to retract the staircase to the inoperative position 50a, as shown in Fig. 4, is to push the assembly forwardly of the vehicle body so that the connecting shaft 58 abuts the most distant part of the slots 39 adjacent to the connecting member 38. In this position, the lowermost step 52 engages the upper surface of the bearing bar 41 and is securely held there because of the tendency of lowermost step 52 to drop between the side frames 53, 54. Of course, the step cannot drop because of the relative proportions of the associated parts such that the forward edge 65 of the lowermost step 52 is disposed rearwardly of the axis of the bearing bar 41; similarly, the assembly 50 is prevented from moving rearwardly into an operative position since the rearward edge 66 of the step 52 is disposed forwardly of the bearing bar 41; gravity in each case maintaining the unit in this retracted position. Because of the large engaging surface of the step 52, the assembly is able to withstand substantial vibration and jarring forces during transit and movement of the vehicle such that it is maintained in the retracted position without the need for additional restraining elements. Therefore, since the unit retracts into a compact assembly, it is at all times maintained within the outer limits of the vehicle body.

Referring now to Figs. 8 through 11 of the drawing, a modified form of staircase assembly is shown wherein a pair of inverted L-shaped brackets 70, 71, are secured beneath the vehicle body in a manner similar to that hereinbefore described. A pair of side frames 73, 74, respectively, are carried by the L-shaped brackets and each is provided with an arcuate cam slot 75 that extends from a point intermediate the length of the side frame to the most distant forward portion thereof where a transverse member 76 is connected to each of the side frames 73, 74, so as to hold them in proper spaced position. A bearing bar 78 is secured between and connects the opposite rearward extremities of the side frames. The staircase assembly 80 comprises a single step 81 disposed between parallel side pieces 82, 83, that are joined at their upper ends by means of a connecting shaft 87. A downwardly extending cam element 85 is carried beneath each side piece 82, 83, for purposes hereinafter described. The outer ends of the connecting shaft 87 extend through the respective arcuate slot 75, as cam followers, in each side frame and are held in place by means of a washer 89 and removable cotter pin 90 disposed outwardly of each side frame.

In an extended or operative position as shown in Fig. 8, the staircase extends rearwardly of the supporting bracket and is spaced above the ground so as to constitute a first step. In this position the connecting shaft 87 is at the rearmost extremity of the slots 75 and the cams 85 are in engagement with and extend rearwardly of the bearing bar 78. The stair assembly 80 is movable to a retracted or inoperative position 80a, as shown in Fig. 10, by urging the staircase forwardly of the vehicle so that the connecting shaft 87 is moved into engagement with the forward transverse member 76 and on the other side of the highest point of the arcuate slot 75. The front edge 94 is thus supported on the bearing bar 78 so that it does not drop out of a substantially horizontal position. Since the distance between the axis of the connecting shaft 87 and the forward edge 94 of the step is greater than the distance between the axis of the bearing bar 78 and the opposite extremity of the slot 75 adjacent to the transverse member 76, the stair assembly cannot be moved from its retracted position without first moving the connecting shaft 87 rearwardly over the peaks or crests of the slots 75, so that the unit is maintained in this retracted position by gravity, and does not require the use of additional restraining or holding members for this purpose. Furthermore, when placed in the retracted position, the entire unit can be maintained within the body lines of the vehicle.

While this invention has been described with particular reference to the specific forms shown in the drawing, it is to be understood that such as not to be construed as imparting limitations upon the invention, which is best defined by the claim appended hereto.

Having thus described my invention, what I claim as new and desire to secure by Letters Patent, is:

As an article of manufacture, a retractable staircase for a truck body comprising in combination a side frame assembly and a staircase assembly, said side frame assembly being attachable as a unit to the underside of a truck body and comprising a pair of similar spaced apart side members having aligned longitudinally extending guide slots, a bearing bar extending transversely between the rear ends of said side members and securing them in said spaced apart relation, and a transverse connecting member extending between and securing together the front ends of said side members, a sleeve freely rotatable on each end of said bearing bar adjacent the inside face of its respective side member, means on said bearing bar to restrain each said sleeve against axial movement relative to the bearing bar; said staircase assembly being carried by said side frame assembly for reciprocating movement therein longitudinally between an extended and a retracted position and comprising two side pieces, a rearwardly extending horizontal step fixedly secured relative to and between said side pieces adjacent the rear ends thereof, a shaft extending transversely through the forwardly extending ends of said side pieces, the outer ends of said shaft extending through the guide slots in the frame assembly and constituting follower means, a replaceable flanged bushing freely rotatably mounted on each end of said shaft with the flange located on the outer side of said frame assembly and the bushing extending through said guide slots, and means on each end of the shaft to prevent outward axial movement of said bushings relative to the shaft; the relative dimensions of said two assemblies, when the step assembly is retracted, being such that the distance between the axis of said shaft and the rearwardly directed edge of said step is substantially greater than the distance between the axis of said bearing bar and the most remote end of said slots; and the distance between the axis of said shaft and said forwardly directed edge of said step is substantially less than the distance between said bearing bar and said remote end of said slots.

References Cited in the file of this patent

UNITED STATES PATENTS

| | | |
|---|---|---|
| 584,676 | Davis | June 15, 1897 |
| 1,148,356 | Chickering | July 27, 1915 |
| 1,471,972 | Miller | Oct. 23, 1923 |
| 2,142,949 | Linker | Jan. 3, 1939 |
| 2,678,831 | Fisher | May 18, 1954 |
| 2,747,888 | Jones | May 29, 1956 |

FOREIGN PATENTS

| | | |
|---|---|---|
| 105,817 | Australia | Nov. 14, 1938 |